March 23, 1926.
G. W. CAMPBELL
TYPEWRITING MACHINE
Filed Sept. 11, 1922
1,577,893
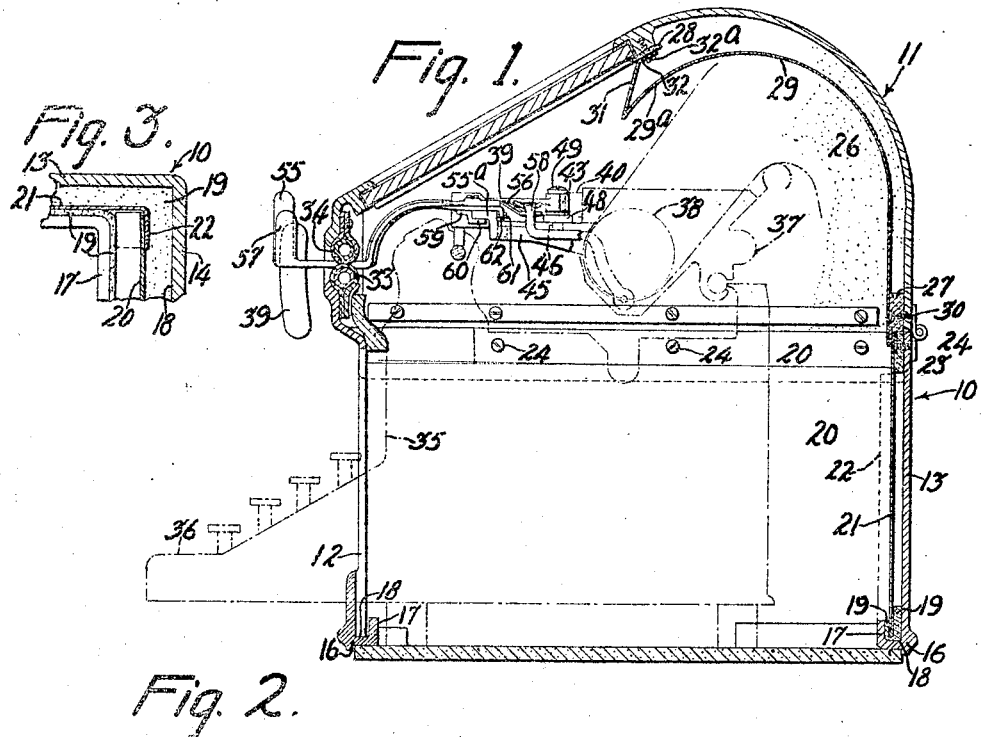
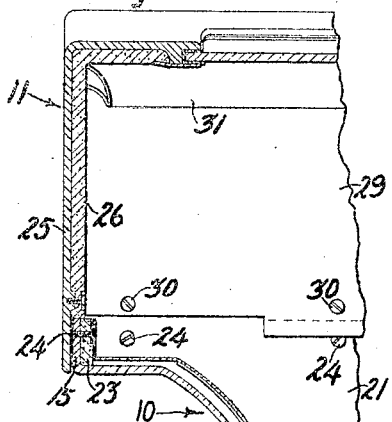
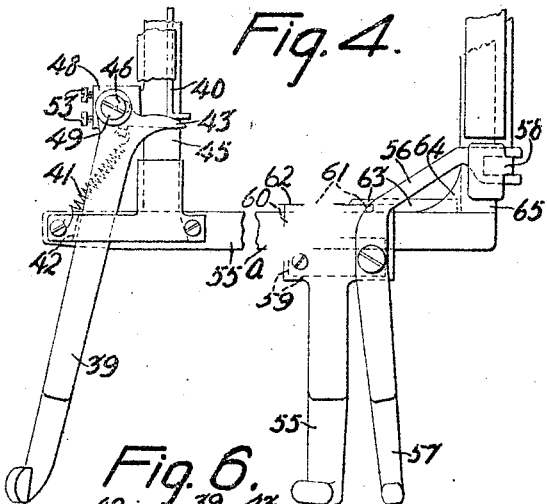
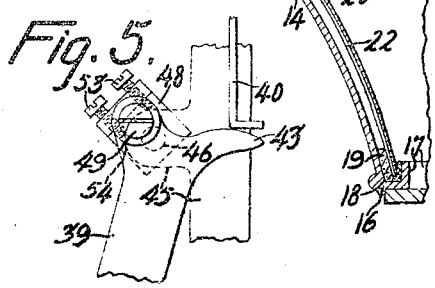
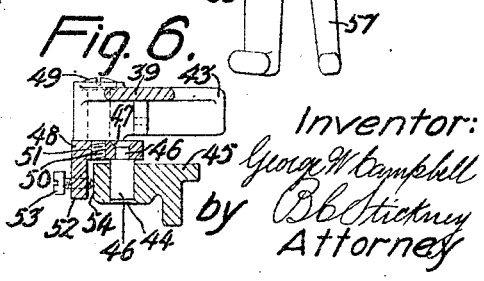
Inventor:
George W Campbell
by O B Stickney
Attorney Patented Mar. 23, 1926.

1,577,893

UNITED STATES PATENT OFFICE.

GEORGE W. CAMPBELL, OF HARTFORD, CONNECTICUT, ASSIGNOR TO UNDERWOOD TYPEWRITER COMPANY, OF NEW YORK, N. Y., A CORPORATION OF DELAWARE.

TYPEWRITING MACHINE.

Application filed September 11, 1922. Serial No. 587,301.

*To all whom it may concern:*

Be it known that I, GEORGE W. CAMPBELL, a citizen of the United States, residing in Hartford, in the county of Hartford and State of Connecticut, have invented certain new and useful Improvements in Typewriting Machines, of which the following is a specification.

The present invention relates to sound-deadening casings for typewriting machines, that is to say, to casings in which a machine may be operated with a minimum of sound. The invention also relates to certain features of the machine itself for better adapting it to be operated within the casing.

Heretofore the sound-deadening properties of felt have been utilized in lining such casings. The felt collects dirt and is difficult to clean. A feature of the invention is the substitution for the lining felt of a metal lining wall having felt gaskets or strips interposed between it and the other wall, leaving extensive air spaces, whereby the casing is deadened.
Another feature of the invention is the provision of a paper-guide projecting downwardly from the casing cover to engage the paper from the platen and incline it rearwardly.
In casings of the character mentioned, the platen-carriage of the machine, with the line-space lever thereon, has movement in letter-feed and return directions. In order that the line-space lever may move with the carriage and nevertheless be operable from the outside of the casing, a slot is provided in the casing longitudinally of the front thereof, and, to seal this slot against emission of sound, its edges have cushions which close it, except where the lever on the carriage extends therethrough. In order to minimize the frictional drag exerted by these cushions upon the line-space lever, so as to permit the lever to be freely operated and the carriage to travel freely, means is provided for positioning the lever with precision between the cushions, by adjusting the lever vertically and securing it in adjusted position.
Another feature of the invention is the provision of means for adjusting the line-space lever toward and from the slide which it operates to effect line-spacing operations, to eliminate unnecessary lost-motion between the lever and slide.

Another feature of the invention is the provision of improved means for mounting on the carriage the carriage-moving handle and carriage-release lever which extend to the exterior of the silence casing, whereby a firmer and more durable support is secured for these members.

Other features and advantages will hereinafter appear.

In the accompanying drawings,

Figure 1 is a vertical section through the casing, from front to rear, showing a typewriting machine in broken lines.

Figure 2 is a transverse vertical section of one end of the casing, as viewed from the front.

Figure 3 is a detail horizontal sectional view, showing the rear right lower corner of the casing.

Figure 4 is a plan view of a portion of the carriage, showing the line-space lever and connected mechanism, and the carriage-release lever with its connected parts.

Figure 5 is a fragmentary detail view, on a larger scale than Figure 4, showing the mounting of the line-space lever.

Figure 6 is a vertical sectional view of the parts illustrated in Figure 5.

In the drawings the casing consists of a body-portion 10 and a cover 11 hinged thereto. The body-portion of the casing comprises a front vertical wall 12, having an opening therein through which the keyboard extension of a typewriting machine may be passed, a rear vertical wall 13, and lateral walls 14, which extend upwardly and outwardly and terminate in short vertical portions 15. These walls are made as a single integral casting. An inwardly-directed horizontal ledge 16, formed near the lower extremities of the walls, extends continuously along them. This ledge has an upwardly-extending vertical flange 17 along its entire inner edge, the ledge and flange co-operating with the walls to provide a channel 18. Strips of felt 19, folded, are inserted in this channel along the rear and side walls. The lower edges of side and rear sheet-metal lining walls 20 and 21 are positioned between the folds of the felt within the channel, and the lining walls extend upwardly therefrom and are spaced from and substantially parallel to the walls of the casing adjacent to which they lie. The rear lining wall 21 is provided with flanges 22 which lie outside the walls 20 and in contact with them for reinforcing them, and for maintaining the side and rear walls in proper co-operative relationship. Strips of felt 23 are interposed between the upper edges of the lining walls 20 and 21 and the corresponding outer walls of the casing, and the upper edges of the lining walls are secured to the outer walls by screws 24, which pass through these felt strips. In the construction just described, the vibration dampening properties of felt are fully utilized, while no felt surfaces are exposed for the collection of dirt.

The top 11 has a window through which the platen is visible. The side walls 25 of the top are lined with felt 26. Strips of felt 27 and 28 are located along the lower rear edges of the top and along the upper portions thereof, just behind the window. A curved metallic lining wall 29 is secured to the outer wall of the casing by screws 30 passing through the felt strip 27. This lining wall is substantially parallel to the outer casing throughout the vertical portion thereof, but diverges from it throughout the forwardly-curved portion to a point in advance of the rear edge of the window, and terminates in an upwardly-directed portion 31 forming a re-entrant angle with the forwardly-curved portion. The portion 31 has a flange 32 along its margin, which is connected to the outer casing by screws 32ª that pass through the flange and the felt 28, the wall 29 being provided with holes 29ª through which access may be had to the screws 32ª. Rolls of felt 33 and 34 are connected, respectively, to the body-portion and the top of the casing along their front edges.

A typewriting machine 35 may be inserted in this casing, when the cover is raised, with its keyboard extension 36 projecting forwardly through a hole in the front wall of the casing into a position where it may be conveniently operated. This typewriting machine is provided with the usual carriage 37, which is driven in letter-feed direction by the usual spring-motor and has its letter-feeding movements controlled by the usual escapement mechanism. Line-spacing movements may be imparted to the platen 38, and the carriage may be returned, from left to right, by a line-space lever 39. This lever operates line-space mechanism of the usual construction through the usual slide 40, and is returned to normal position by a coil-spring 41 connected to itself and to a portion of the carriage-frame, this normal position being determined by engagement of the lever with a shoulder 42 on the carriage-frame. The slide 40 is returned to its normal position by a spring (not shown). It is desirable that the slide 40 and the lever 39 be, normally, in such positions that the end of the slide and the toe 43 of the lever will be almost, but not quite, in contact with each other. For the purpose of providing adjustment whereby this relationship will be caused to exist, and for making provision for vertical adjustment of the line-space lever, the lever of the present machine is mounted in a novel manner. In a hole 44, ordinarily provided in a bracket 45 of the carriage-frame, is a pin 46. The upper reduced end of the pin 46 is passed through an opening 47 of a bracket 48 and upset. The lever 39 is pivotally mounted on the bracket 48 by means of a pivot-pin 49, which passes therethrough and has its lower threaded end 50 engaged in a threaded opening 51 of the bracket. This opening 51 is formed at one side of the hole through which the reduced portion of the pin 46 passes. A downwardly-extending portion 52 of the bracket 48 has two set-screws 53 adapted to be tightened against a surface 54 of the bracket 45, which is concentric with the center of the hole 44 therein. By reason of the construction thus described, the lever 39 may be adjusted vertically by partially withdrawing the pin 46 from the hole 44 and tightening the screws 53, thus securing the lever in the desired vertical position relatively to the slot in the front of the casing. By rotating the bracket 48 about the pin 46 when the screws 53 are loosened, the pivot of the lever 39 may be moved bodily, thereby adjusting the lever itself forwardly or rearwardly to position the toe of the lever in precisely the relationship to the slide 40 which it is desired to have it normally assume, Mounted on the front beam 55ª of the carriage, near the right extremity thereof, is a carriage-moving handle 55. A carriage-release lever 56 is pivotally mounted upon the carriage-moving handle. This lever has an operating handle 57 at its outer end, and is bifurcated at its inner end to embrace an upwardly-extending portion of the ordinary carriage-releasing lever 58. The lever 56 is operable to actuate the lever 58, and the latter lever is thereby caused to release the carriage from the influence of the escapement mechanism in the usual manner. In common with other machines of this type, the carriage-moving handle 55 is secured upon the front beam 55ª by a plate 59, connected to the lower face of the carriage-moving handle by screws and having an offset portion 60 underlying the beam, and by screws 61 received in a downwardly-extending flange 62 of the carriage-moving handle and engaging the rear face of the beam 55ª.

According to the present invention, the downwardly-extending flange 62 of the carriage-moving handle is provided with an integral lug or finger 63, which extends along the rear face of the front beam to a position beneath and in snug engagement with a web 64 formed between the front and side beams 55ª and 65 of the typewriter-carriage. This serves to brace and strengthen the mounting of the carriage-moving handle and the carriage-release lever very materially, and lessens the liability of the connection to become loosened.

Variations may be resorted to within the scope of the invention, and portions of the improvements may be used without others.

Having thus described my invention, I claim:

1. In a sound-deadening casing for typewriting machines, a body-portion consisting of a single casting having a channel formed adjacent its lower extremity, a plate having its lower edge received in said channel, vibration-dampening material positioned in the channel on both sides of the plate and completely filling the spaces between the plate and the walls of the channel, vibration-dampening material spacing the upper end of the plate from the casing, and means for attaching the plate to the casing at its upper end.

2. In a sound-deadening casing for typewriting machines, a body-portion composed of outer walls, a ledge extending inwardly near the lower edge of one of said walls having an upwardly-extending flange thereon, vibration-dampening material in the space between the walls and flange, a plate having its lower edge embedded in the vibration-dampening material, and means for connecting the upper edge of the plate to the outer wall of the casing.

3. In a sound-deadening casing for typewriting machines, a body-portion comprising outer walls having a channel formed within the casing adjacent one extremity thereof, felt packing inserted within the channel, inner walls, each having an edge embraced by the felt packing within the channel, and means for connecting the edges of the inner walls, which are remote from the channels, to the outer walls in spaced relationship thereto, including strips of sound-deadening yielding material packed between said remote edges and said outer walls, and means fastening said edges and walls upon said strips.

4. In a sound-deadening casing for typewriting machines, a body-portion comprising outer walls having upstanding spaced flanges at their lower ends, side and rear inner walls, the lower edges of the inner walls being received between the flanges and the outer walls, sound-deadening packings confining said lower edges and confined by said flanges, flanges on the rear inner wall lying outside the lateral inner walls and in contact therewith, means connecting the inner walls at their upper edges to the outer walls, and sound-deadening packing strips between said upper edges and said outer walls.

5. In a combined sound-deadening casing and typewriting machine having a platen, said casing having a body-portion, and a top hinged in rear thereto and comprising a curved upper wall, a paper-deflector forming an inner wall connected to the upper wall of said top and diverging downwardly therefrom towards said platen and forming a paper-guide at the delivery side of the platen, and vibration-dampening material enclosed between the borders of said upper and inner walls, to form a sound-subduing air space.

6. In a combined sound-deadening casing and typewriting machine having a platen, said casing having a body-portion, and a top hinged in rear thereto and comprising a curved upper wall, a paper-deflector forming an inner wall connected to the upper wall of said top and diverging downwardly therefrom towards said platen and forming a paper-guide at the delivery side of the platen, and vibration-dampening material enclosed between the borders of said upper and inner walls, to form a sound-subduing air space, said top having a window over said platen, and said paper-guide extending downwardly and forwardly to a position below and in front of the rear edge of said window.

7. In a combined sound-deadening casing and typewriting machine having a carriage, the casing having a cushioned slot extending longitudinally of the front thereof, said carriage having a line-spacing lever projecting forwardly through the slot and moving along the slot as the carriage moves, and vibrating along the slot, yielding means for supporting the machine in the casing, and means to compensate for the yielding of the support, including means for adjusting the line-spacing lever vertically relatively to the slot and for securing it in its adjusted position upon the carriage.

8. In a combined sound-deadening casing and typewriting machine having a carriage, the casing having a cushioned slot extending longitudinally of the front thereof, said carriage having a line-spacing lever projecting forwardly through the slot and moving along the slot as the carriage moves, and vibrating along the slot, yielding means for supporting the machine in the casing, and means to compensate for the yielding of the support, including means for adjusting the line-spacing lever vertically relatively to the slot and for securing it in its adjusted position upon the carriage, said adjusting means including a bracket mounted on said carriage, said line-spacing lever being pivoted on said bracket, and means for adjusting the bracket vertically.

9. In a typewriting machine, a carriage-frame having a hole therein, a line-spacing lever, a bracket on which the line-spacing lever is pivoted, a pin on said bracket received in the hole on the carriage-frame and movable bodily therein, and means co-acting with the pin for clamping the carriage-frame, to secure the bracket in adjusted vertical positions.

10. In a typewriting machine, a line-spacing lever, a bracket upon which the line-spacing lever is mounted, said bracket being capable of vertical bodily movement and horizontal rotary movement, and means for holding the bracket in adjusted position against both horizontal and vertical movements.

11. In a typewriting machine, a carriage-frame having a hole therein, a pin rotatable and movable bodily in said hole, a bracket connected to said pin, a line-spacing lever eccentrically mounted on said bracket, and means on the bracket for engaging the carriage-frame and securing the bracket against both horizontal and vertical movements.

12. In a typewriting machine, in combination, a carriage having side and front beams and a web connecting them, a carriage-moving handle, means connecting the carriage-moving handle to the front beam of the carriage, and a finger on the carriage-moving handle engaging the lower face of the web between the front and side beams.

13. In a typewriting machine, in combination, a carriage having side and front beams and a web connecting them, a carriage-moving handle, a plate secured to the carriage-moving handle and having an off-set portion co-operating with the carriage-moving handle to embrace a portion of the front beam of the carriage, screws on the carriage-moving handle engaging the rear face of the front beam, and a finger extending laterally from the carriage-moving handle and engaging the lower face of the web.

14. In a typewriting machine, in combination, a carriage having front and side beams and a web connecting them, a carriage-moving handle, a carriage-releasing lever pivotally mounted on the carriage-moving handle, means connecting the carriage-moving handle to the front beam, and a laterally-extending finger on the carriage-moving handle in contact with the rear face of the front beam and the lower face of the web.

15. In a typewriting machine, in combination, a carriage-frame including a front beam having a rearward projection thereon, a carriage-moving handle, a plate secured to the carriage-moving handle and having an off-set portion co-operating with the carriage-moving handle to embrace a portion of the front beam of the carriage, and a finger on the carriage-moving handle underlying and engaging the rearward projection on the front beam of the carriage.

GEORGE W. CAMPBELL.